United States Patent [19]
Petrosky

[11] 3,991,508
[45] Nov. 16, 1976

[54] RAT REMOVING

[76] Inventor: Charles Petrosky, 1118 N. Jefferson St., Arlington, Va. 22314

[22] Filed: Jan. 10, 1975

[21] Appl. No.: 540,223

[52] U.S. Cl. .............................................. 43/66
[51] Int. Cl.² ..................................... A01M 23/08
[58] Field of Search ................................. 43/65, 66

[56] References Cited
UNITED STATES PATENTS

| 926,419 | 6/1909 | Huggins | 43/65 |
| 986,977 | 3/1911 | Harris | 43/66 |
| 1,010,256 | 11/1911 | Harris | 43/66 |
| 1,226,288 | 5/1917 | White | 43/66 |
| 2,263,650 | 11/1941 | Schreyer | 43/66 |
| 2,377,967 | 6/1945 | Rice | 43/66 |

*Primary Examiner*—Warner H. Camp
*Attorney, Agent, or Firm*—James C. Wray

[57] ABSTRACT

A container has one or more openings which extend into the container down elongated passageways. The passageways have needle prodders mounted along sidewalls to discourage rodent retreat once a rodent has entered the passageway. The interior ends of the passageways have doors with small holes for permitting rodents to smell enticing substances on the interior of the container, which doors are structured with lengths greater than the height of the passageways such that the doors extend into the interior of the container at an angle and can only be opened into the interior. The doors have needles on interior sides to keep rodents captured therein away from said doors. Sidewalls of the passageways extend into the interior of the container for keeping captured rodents away from side edges of the doors when in any open position. The passageways and an emptying means are sealable so that lethal vehicle exhaust can be connected to the container at an inlet port or at one of the passageways for killing rodents captured therein with carbon monoxide.

1 Claim, 4 Drawing Figures

RAT REMOVING

BACKGROUND OF THE INVENTION

Rodents, especially rats, are, and for a long time have been, a major problem in metropolitan areas. One of the main problems of rats is their common domestication and lack of extreme fear of humans and preference of foods used by humans. While rats are a great problem in rural areas, the existence of many rats with many humans in metropolitan areas greatly magnifies their dangers and destructiveness.

It has been estimated that in the United States alone rats cause between one-half and one billion dollars annually in terms of direct economic losses. Most of these losses are occasioned by the contamination of foodstuffs while the rats are feeding and the physical damage to other materials because of the rat propensity to gnaw.

Rats are a hazard to the life, physical and mental health and welfare of human beings.

Rat bites are quite common. In a city such as Washington, D.C., for example, several thousand rat bites may be encountered each year. Great damage or death may be caused to infants or invalids. Several diseases are associated with rats, the most common of which are rat-bite fever, leptospirosis, salmonellosis from foods contaminated with rat droppings, trichinosis spread to people from hogs which eat garbage containing droppings of infected rats, and rat parasite spread diseases such as murine typhus fever, plague and rickettsialpox. Other diseases which have been traced directly to rats are toxoplasmosis, listeriosis, and lymphocytic choriomeningitis.

Ridding areas of rodents has always been a recognized problem to which time and energy have been devoted.

All successful methods require the diligent cleaning of areas and maintaining areas in cleanly condition with foodstuffs and garbage stored appropriately to prevent infiltration by rats. Even an area which has been substantially cleared of rats may become reinfected in a short time if the basic precautions of cleanliness and proper storage facilities are not maintained.

One of the most effective ways of ridding an area of rats is by the use of poisons. Many poisons have been developed which have fair rat-killing power, but are dangerous to other animals and humans, and create problems of availability of antidotes for use in case of accidents.

All poisons are inherently dangerous and must be prepared, mixed, distributed and used carefully.

Poisons are not only dangerous when swallowed, but also the dust and fumes of many poisons may be extremely dangerous when inhaled or when contacting broken skin of handlers. Many poisons create a great danger of secondary poisoning, that is, animals may feed on the carcasses of poisoned animals and thus become poisoned themselves, and humans may also become poisoned by eating the meat of poisoned animals.

In addition to the inherent dangers involved in the use of ordinary poisons for rat extermination, the exorbitant costs of time and money make their use prohibitive. For example, when the common poisoning methods are employed, extreme precautions must be taken to insure against access to the poison by children and dogs and cats by giving public notice and keeping records of poisoned locations.

Another way of ridding an area of rats is by trapping. While trapping is successful in small installations, the use of existing traps is usually not successful for large scale applications.

Another method of controlling rats lies in the use of sound or ultrasonic radiation to keep rats out of protected premises. While that method denies certain areas to rats, it may not be effective in destroying large rat populations.

A discussion of control of domestic rats is found in the U.S. Department of Health, Education and Welfare Public Health Service Pamphlets available from the Consumer Protection and Environmental Health Service, Environmental Control Administration, Rockville, Maryland 20852. An example of such a publication is PHS Publication 563 (1956, 1969) entitled "Control of Domestic Rats and Mice".

A collection of descriptions of systems and apparatus for controlling rodents and vermin is found in the United States Patent Office Classification of Technology at Class 43, and particularly in subclasses 58 through 73. There are found United States patents officially classified within that class and cross-referenced into that class, unofficial references collected by the examiner, and foreign patents and publications collected by the examiner. Examples of disclosures found in that class are: U.S. Pat. Nos. 329,960; 710,020; 938,397; 1,020,690; 1,102,896; 1,108,724; 1,115,681; 1,139,587; 1,161,558; 1,163,071; 1,168,252; 1,314,200; 1,446,609; 1,538,308; 2,056,882; 2,255,955; 2,387,328; 2,962,836; 3,528,190 and Ser. No. 462,501.

Many problems remain in known existing systems and devices for the control of rats. Some of the problems are the inherent dangers of known chemicals used in poisoning techniques, the difficulties of trapping and killing rats in small numbers, and the lack of large scale apparatus for the systematic collection and destruction of rats without dangers of poisons and inefficiency of micro operations.

SUMMARY OF THE INVENTION

The present invention employs baiting techniques and trapping techniques in large traps and killing techniques for mass execution of rodents, all without danger to the environment, animals or people and without possibilities of secondary poisoning or other residual effects.

Broad objectives of the present invention are accomplished by use of a container, large enough to hold the rodent sought or larger, constructed with sidewalls rising from a bottom wall and with a top wall covering the container. One sidewall is provided with an opening which then extends down an elongated passageway into the interior of the container. The passageway is constructed with two elongated sidewalls connected to an elongated bottom wall and covered by an elongated top wall. One end of the passageway is connected by any means to the opening in the sidewall of the container, and the other end is extended into the interior of the container.

Preferably, the passageway is provided with a means for prodding rodents forward into the interior of the container. In a preferred embodiment the means for prodding the rodents forward consists of needles mounted on the elongated sidewalls of the passageway facing out from the passageway sidewalls and generally toward the interior end of said passageway. The width of the passageway is such that, with the needles mounted, once in the passageway a rodent is discouraged from attempting to turn around or to retreat from the passageway and is prodded forward into the passageway toward its interior end. At the interior end of the passageway, a door is connected which permits the rodent to pass into the interior of the container but denies escape. Preferably, this is accomplished with a door connected to a hinge device at its top edge, which is in turn connected to the top edge of the top wall of the passageway. The door is constructed to be the same width as the passageway, but it is somewhat longer than the height of the passageway. Thus, the door is perpendicular to the bottom wall of the container, but extends at an angle into the interior of the container from the top edge of the passageway. This configuration permits the door to swing inward into the interior of the container, but does not permit the door to be opened in the opposite direction.

In a preferred embodiment the door has needles mounted on the side which faces into the interior of the container pointing outward into the interior for keeping rodents captured therein away from said door, thus denying escape when other rodents enter.

In another preferred embodiment, the two elongated sidewalls of the passageway extend into the passageway a distance equal to the length of the passageway door, beyond the point on the passageway top wall where the door and hinge are connected. This configuration would deny rodents captured on the interior of the container access to open edges around the door when the door is in any open position during the ingress of another rodent.

The door on the passageway, in another preferred embodiment, is provided with small holes, or mesh, for permitting the rodent to smell enticing substances placed on the interior of the container and for encouraging the rodent to push the door open and enter.

In another embodiment, the container is provided with more than one opening with passageways, prodders and doors as described above. More openings and passageways would allow more opportunity for rodents to enter and would allow more than one to enter at any one time. The number of openings and passageways that could be added is only limited by the size of the container.

In a preferred embodiment of the invention, the entire top wall of the container is removable from the container for gaining access to the entire inside of the container. Windows are provided in the container, preferably in the sidewalls for visual inspection of the container contents in order to determine the number of rodents which have been collected in the container. In one form of the invention, the viewing windows are hinged over screens which may also be hinged for access to the container. In a preferred form of the invention, a special door is provided for bait access to the container. An inside of the door is provided with a hook for mounting bait.

In a preferred embodiment of the invention, killing the rodents is accomplished by filling the container with lethal exhaust fumes from an engine. In one embodiment, a hose connected to an engine is attached to the container at one inlet port and all passageways are sealed shut. The passageways may have individual covers or, preferably, be interconnected so a single lever closes all covers.

The container may be filled with fumes for a predetermined time period and then sealed off to retain the fumes within the container. Such a procedure is useful when a container is filled with exhaust fumes before loading it on a truck, or when several containers are to be filled with fumes to kill rodents and then to be left unattended. The inlet port or inlet passageway where the exhaust is connected in this case is provided with a sealable entrance which may be closed by a valve or door.

In another embodiment of the invention, a vent is provided at a point in the container distantly removed from the inlet port or inlet passageway. The vent has a slight opening so that fumes continually flow outward through the vent, thus insuring the continuing washing of the container with fresh exhaust fumes. That mode is employed when exhaust fumes are supplied continuously to the container, such as during the traveling of a vehicle. In a preferred embodiment, the container vents and exhaust fume entrance connections are mounted in walls and configured so that several containers may be pushed together, connecting the exhaust vent of one container so that rodents in several containers may be killed at the same time.

Preferably inlet ports and vents are provided with screened enclosures on the interior to insure against blocking of the ports with carcasses of dead rodents or other obstructions.

The primary lethal gas in exhaust fumes is carbon monoxide. Carbon monoxide has a molecular weight of 28. Air, which is chiefly composed of nitrogen and oxygen, has a molecular weight of 29. Carbon monoxide mixes well with air and the mixture is enhanced by the continued storing of the gases such as by the continued flow-through of exhaust fumes.

In another embodiment, the one-way door has needles on an interior side and walls that extend beyond the point where the door is hinged a distance equal to the length of the door and all other features described above, concerning killing, baiting, and use of the container are provided except that the door is hinged directly to the opening in the sidewall of the container, without the use of an elongated passageway or needle prodders.

The device is also provided with a means for emptying the dead carcasses after death. It must be sealable so that lethal gas will not escape and lockable so that captured rodents cannot escape. Preferably, the emptying means consists of a vertically sliding gate.

One object of the invention is the provision of a rodent trapping apparatus which employs a container of any size with one or more openings having one or more elongated passageways extending therefrom into the interior of the container with bait inside for trapping rats.

Another object of the invention is the use of a rodent trapping apparatus, which employs a container of any size with one or more openings with passageways extending into the interior of the container which employs a means for prodding rodents along the passageways toward the interior of the container.

Another object of the invention is the provision of a rodent trapping apparatus which employs elongated passageways wherein the prodding means comprises needles mounted on interior sides of sidewalls of the passageways at angles less than perpendicular to the plane of the sidewalls of the passageways and pointing generally in the direction of the interior of said container.

The invention has as another object the provision of a rodent trapping apparatus comprising a means for permitting rodent entrance into the interior of the container while denying escape.

As an object of the invention the means for permitting rodent entrance into the interior of the container while denying escape comprises a door connected to the elongated passageway by means of a hinge-type device connected by any means to a top edge of an interior end of a top wall of the passageway and to a top edge of the door, wherein said door has a length greater than the height of the passageway such that it extends from the top edge of the interior end of the passageway at an angle into the interior of the container.

A further object of the invention is the provision of a rodent trapping apparatus which employs an elongated passageway with prodders mounted on its interior sidewalls, a door at the interior end of the passageway and sidewalls of the passageway which extend into the interior of the container beyond the point on the top wall of the passageway wherein the door is connected a distance equal to the length of said door.

As a further object of the invention, a rodent trapping appparatus employs an elongated passageway, prodders along the passageway, a one-way door with walls extended at its side edges and employs the use of small holes placed in the door for permitting rodents to smell any rodent-enticing substance placed in the interior of the container.

Another object of the invention provides for a rodent trapping apparatus employing an elongated passageway, prodders along the passageway, a one-way door with walls extended at its side edges, small holes placed in the door, and further employs means connected to the interior side of said door for keeping rodents captured on the interior of the container away from said door, preferably comprising needles connected to an interior side of the door pointing outward from the door into the interior of the container.

One object of the invention is to provide a rodent trapping apparatus employing a door connected to an opening in a sidewall of the container by means of a hinge-type device connected by any means to a top edge of the opening and to a top edge of the door, wherein said door has a length greater than the height of the opening such that it extends from the top edge of the opening at an angle into an interior of the container, the door having small holes in it for permitting rodents to smell any rodent-enticing substances placed on the interior of the container, needles connected to an interior side of the door pointing outward from the door into the interior of the container for keeping rodents away from said door and employing walls connected by any means to side edges of the opening in the container which extend into the interior of the container beyond the opening a distance equal to the length of said door for denying rodents access to edges of the door when it is in any open position.

These and further and other objcts and features of the invention are apparent in the disclosure which includes the foregoing and ongoing specification and claims and the drawings.

DETAILED DESCRIPTION OF THE DRAWING

Figure 1:
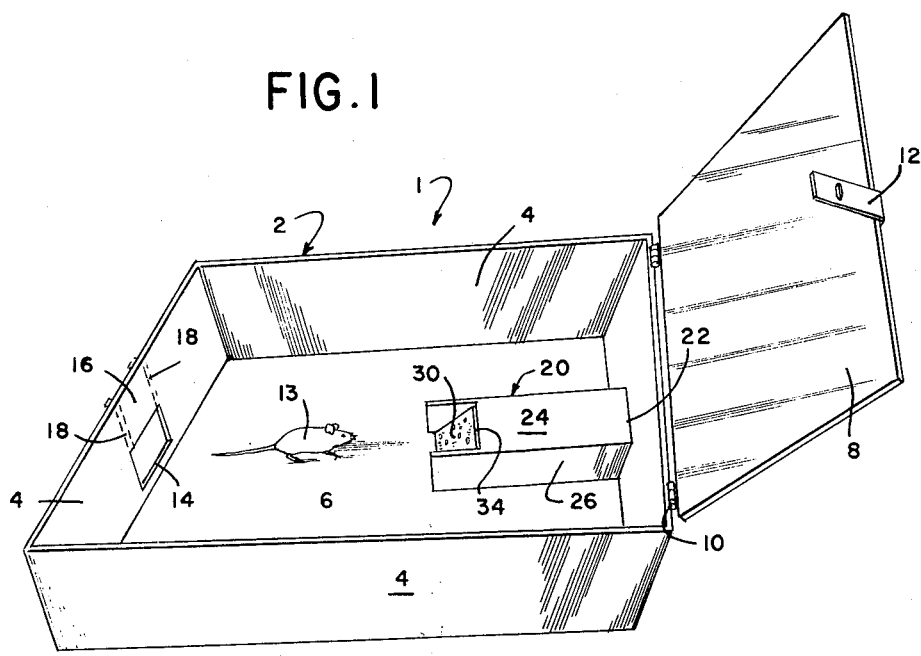
FIG. 1 is a perspective view of the rat trapping apparatus with a cover open.

A rodent trapping apparatus is generally indicated by the numeral 1 in FIG. 1. The apparatus comprises a container 2, which has sidewalls 4, a bottom wall 6 and a top wall 8. The top wall 8 is connected to sidewall 4 by hinges 10 for emptying the container 2 and for gaining access to an interior of the container. The top wall 8 is locked by a hasp 12. In a preferred embodiment the top wall 8 is made of a transparent material for viewing the interior of the container. In another embodiment, the emptying means are provided by an opening 14 which is closed by a door 16 which slides vertically in two channels 18.

Figure 2:
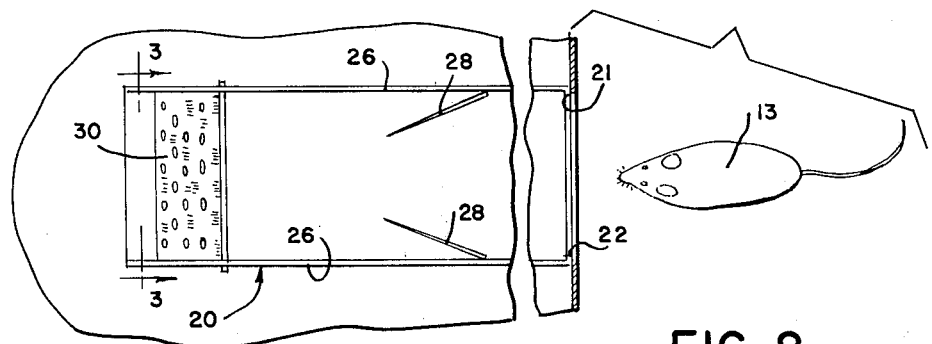
FIG. 2 is a detailed section of the passageway.

The container 2 has a passageway 20 which has a proximal opening 21 connected to an opening 22 in a sidewall 4. The passageway has a top wall 24, sidewalls 26 and a distal opening communicating with the interior of the container. A fragmented view of the passageway 20 is shown in FIG. 2, with the passageway top wall 24 removed. This view shows needles 28 mounted on interior sides of the passageway side walls 26 and pointed out into the passageway at angles less than perpendicular to an axis of the passageway and pointed generally in the direction of the distal opening and the interior of the container for prodding rodents 13 toward the distal opening once they are in the passageway.

Figure 4:
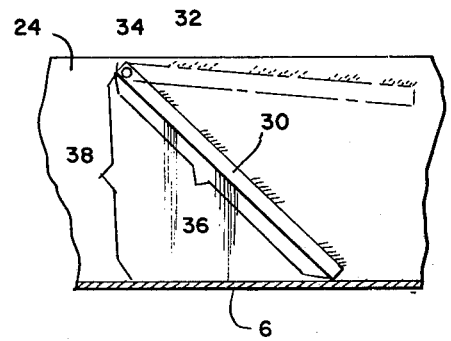
FIG. 4 is a side detail of the door.

At the distal end of the passageway 20, a door 30 is connected for permitting rodent entrance into the interior of the container while denying escape. FIG. 4 shows a fragmented side view of the door 30. A hinge 32 is connected at the distal opening to an edge 34 of an interior end of the passageway top wall 24 and connected to the door 30. The door 30 has a length 36, which is greater than a height 38 of a passageway 20, such that it extends from the edge 34 of the interior end of the passageway top wall 24 at an angle into the interior of the container. In FIG. 1, passageway sidewalls 26 extend into the interior of the container beyond the edge 34 of the interior end of the passageway top wall 24 a distance equal to the length 36 of the door 30 for denying rodents access to side edges of the door 30 when it is in an open position.

Figure 3:
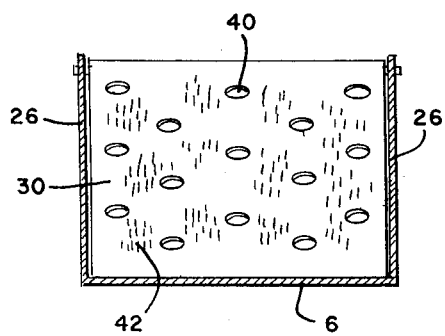
FIG. 3 is a front detail of the door.

In FIG. 3 a fragmentary view of the door 30 is shown. In a preferred embodiment, holes 40 are placed in the door for permitting rodents to smell rodent-enticing substances placed in the interior of the container. In another preferred embodiment, needles 42 are connected to an interior side of the door 30 and pointed outward from the door into the interior of the container for keeping captured rodents in the interior of the container away from the door.

While the invention has been described in part with reference to a specific embodiment, those skilled in the art may construct modifications or variations of the invention which do not depart from its teachings or the scope of the invention. The scope of the invention is defined in the following claims.

What I claim is:

1. Rodent trapping apparatus comprising a container with solid sidewalls, a bottom wall connected to the sidewalls and having a solid top wall hinged at one edge to one of the sidewalls and overlying upper edges of the sidewalls in completion of the container, latch means connected to the top wall and to a sidewall opposite the hinge, sidewall opening and sliding cover means for emptying the contents of the container connected to and mounted on a sidewall of the container, and an elongated solid wall passageway, having a proximal opening connected to a sidewall opening in one of the sidewalls, the passageway extending into an interior of the container and having a distal opening communicating with an interior of the container for providing rodent ingress to the container, first and second opposite long sharp needles connected interiorly to opposite solid sidewalls of the passageway and spaced shortly inward from the container sidewall for prodding rodents toward the distal opening and into the interior of the container, a hinge connected to the passageway at the distal opening and at a top edge of an interior end of a top wall of the passageway and a door connected to the hinge at a top edge of the door, wherein said door has plural holes and has a length at least one and one half times a height of the passageway such that it extends from the top edge of an interior end of the passageway for a long distance into the container and long sharp needles connected to an interior side of the door and pointed into the interior of the container whereby the needles prod rodents away from the door, and wherein the sidewalls of the passageway extend into the interior of the container beyond the point on the top edge of the passageway where the door is connected a distance equal to the length of said door.

* * * * *